(12) United States Patent
Jung

(10) Patent No.: US 7,315,495 B2
(45) Date of Patent: Jan. 1, 2008

(54) HIGH-SPEED FOCUS PULL-IN CONTROLLERS FOR ADAPTIVELY RESPONDING TO DISK SURFACE VIBRATION OF AN OPTICAL DISK DEVICE AND FOCUS CONTROL METHODS THEREOF

(75) Inventor: Woo-min Jung, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 517 days.

(21) Appl. No.: 11/057,983

(22) Filed: Feb. 15, 2005

(65) Prior Publication Data

US 2005/0195708 A1 Sep. 8, 2005

(30) Foreign Application Priority Data

Mar. 8, 2004 (KR) ............. 10-2004-0015590

(51) Int. Cl.
*G11B 7/00* (2006.01)

(52) U.S. Cl. ............... 369/44.29; 369/44.25; 369/44.35

(58) Field of Classification Search ............ None
See application file for complete search history.

(56) References Cited

U.S. PATENT DOCUMENTS 6,154,425 A * 11/2000 Iida et al. ............... 369/44.29

FOREIGN PATENT DOCUMENTS

| JP | 10031828 A | * | 2/1998 |
| JP | 2000155953 A | * | 6/2000 |
| JP | 2003036546 (A) | | 2/2003 |
| KR | 100290735 B1 | | 3/2001 |
| KR | 010058416 A | | 7/2001 |

* cited by examiner

*Primary Examiner*—William R. Korzuch
*Assistant Examiner*—Jorge L. Ortiz-Criado
(74) *Attorney, Agent, or Firm*—Myers Bigel Sibley & Sajovec, P.A.

(57) ABSTRACT

Upper and lower limit values of disk surface vibration are detected and stored per a predetermined time while a signal is reproduced from an optical disk device and, if focus on the disk deviates from a focus allowable range initially set, a focus repull-in operation is performed with reference to the upper and lower limit surface vibration values stored previously.

14 Claims, 6 Drawing Sheets

HIGH-SPEED FOCUS PULL-IN CONTROLLERS FOR ADAPTIVELY RESPONDING TO DISK SURFACE VIBRATION OF AN OPTICAL DISK DEVICE AND FOCUS CONTROL METHODS THEREOF

RELATED APPLICATIONS AND CLAIM OF PRIORITY

This application is related to and claims priority from Korean Patent Application No. 2004-15590, filed on Mar. 8, 2004, in the Korean Intellectual Property Office, the disclosure of which is incorporated herein in its entirety by reference.

FIELD OF THE INVENTION

The present invention relates to optical disk devices, and more particularly, to focus controllers for responding to disk surface vibration of an optical disk device.

BACKGROUND OF THE INVENTION

Disk-type optical recording mediums are widely used. As recording density increases, various optical disk devices including CD, DVD, MOD (Magnetic Optical Disk), etc. have been developed. To reproduce a high-quality signal from an optical disk device, a laser spot should maintain focus and be tracked along a signal recording surface. However, the optical disk's rotation may cause surface vibration of the optical disk. If the surface vibration is more than an allowable amount, accurate focusing and tracking cannot be performed, which may cause intermittent interruption of the reproduced signal.

To cope with surface vibration of the disk, a surface vibration component is detected while the optical disk rotates once when the optical disk is first loaded, and compensation operations such as radial adjustment and defocus control are performed using the detected surface vibration component before the signal is reproduced from the optical disk. By performing these operations, when the signal is reproduced from the optical disk, focusing of the optical pickup device is performed within a focus search range that is initially set based on the initial detection of the surface vibration component for the optical disk. By performing these operations, when the signal is reproduced from the optical disk, focusing of the optical pickup device is performed within a focus search range which is initially set against surface vibration of the optical disk or deck However, the surface vibration component of the disk is not constant over the entire area of the disk. In particular, the surface vibration component of the disk may have a greater value in the outer portion than in the inner portion of the disk. Accordingly, whenever the surface vibration component becomes greater than a predetermined allowable value, the process which detects a new surface vibration component generated during one rotation of the disk is repeated to determine a new focus search range and then the optical pickup device can be refocused. Such a focus repull-in operation may consume much time and generate intermittent interruption of reproduction of the signal from the optical disk.

SUMMARY OF THE INVENTION

Some embodiments of the present invention provide a focus pull-in controller of an optical disk device that includes a focus error compensator filter configured to receive a focus error signal, compensate the focus error signal for amplitude and phase of the focus error signal, and output the compensated result to as a first focus output signal; an upper limit value detector configured to detect and store an upper limit surface vibration value of the first focus output signal; a lower limit value detector configured to detect and store a lower limit surface vibration value of the first focus output signal; a focus error range setting unit configured to set a focus error search range based on the upper limit surface vibration value and the lower limit surface vibration value of the focus error signal; an amplifier configured to multiply an output signal of the focus error range setting unit by a predetermined error margin coefficient K; a first mixer configured to sum an output signal of the upper limit value detector with an output signal of the amplifier; a second mixer configured to sum an output signal of the lower limit value detector with the output signal of the amplifier; and a triangular wave generator configured to generate a second focus control output signal in response to output signals of the first and second mixers.

The focus pull-in controller may further include an ABCD sum check unit configured to mix signals emitted from a quadrantal photodiode in the optical disk device. The amplifier may multiply an output signal of the focus error range setting unit by a predetermined error margin coefficient K, in response to an output signal of the ABCD sum check unit. The predetermined error margin coefficient K may be defined by $2^n$ wherein n is a count of focus pull-in operations. The count n of focus pull-in operations may be initially zero and may be increased by one when a focus pull-in operation is performed.

Some embodiments of the present invention provide a focus pull-in controller of an optical disk device that includes an upper limit value storage unit configured to store an upper limit value of a focus error signal within a focus error allowable range detected at an initial focus-on point of the disk; a lower limit value storage unit configured to store a lower limit value of the focus error signal within the focus error allowable range detected at the initial focus-on point of the disk; a focus error compensator filter configured to receive the focus error signal, compensate for amplitude and phase of the focus error signal, and output the compensated result as a first focus output signal; an upper limit value detector configured to detect and store an upper limit surface vibration value of the first focus output signal; a lower limit value detector configured to detect and store a lower limit surface vibration value of the first focus output signal; a focus error range setting unit configured to set a focus error search range based on the upper limit surface vibration value and the lower limit surface vibration value of the first focus error signal; an ABCD sum check unit configured to mix signals from a quadrantal photodiode; an amplifier configured to multiply an output signal of the focus error range setting unit by a predetermined error margin coefficient in response to an output signal of the ABCD sum check unit; a first mixer configured to mix an output signal of the upper limit value detector with an output signal of the amplifier; a second mixer configured to mix an output signal of the lower limit value detector with an output signal of the amplifier; a first switch configured to provide as an output a selected one of an output signal of the first mixer or an output signal of the upper limit value storage unit; a second switch configured to provide as an output a selected one of an output signal of the second mixer or an output signal of the lower limit value storage unit; a triangular wave generator configured to generate a second focus output signal as a triangular wave in response to the output signals of the first and second switches; and a third switch configured to selectively output the first focus output signal or the second focus output signal.

In further embodiments of the present invention, the error margin coefficient is defined by $2^n$ wherein n is a count of focus pull-in operations. The count n of focus pull-in operation may be initially zero and increased by one when a focus pull-in operation is performed. Each of the first and second switches may be configured to transfer the respective one of the output signals of the first and second mixers to the triangular wave generator if the focus error signal deviates from the focus error allowable range. The third switch may be configured to output the second focus output signal if the focus error signal deviates from the focus error allowable range.

Some embodiments of the present invention provide methods of controlling focus in an optical disk device that include rotating a disk when the disk is loaded in the optical disk device; performing initial focusing while moving an actuator of an optical pickup unit in the optical disk device toward the disk; storing a focus error allowable range corresponding to a range between an upper limit value and a lower limit value of a focus error signal when focus is achieved on the disk; setting a focus error search range using a focus error signal; outputting, as a focus output signal, an output signal of a focus error compensator filter that receives the focus error signal if the focus error signal is within the focus error allowable range; averaging the output signal of the focus error compensator filter and obtaining and storing an upper limit surface vibration value and a lower limit surface vibration value based on the averaged output signal; performing a focus pull-in operation with reference to a value obtained by multiplying the focus error search range by an error margin coefficient K, the upper limit surface vibration value, and the lower limit surface vibration value to provide the focus output signal if the focus error signal deviates from the focus error allowable range; and controlling focusing of the optical pickup unit according to the focus output signal.

The focus error compensator filter may compensate for amplitude and phase of the focus error signal. The error margin coefficient K may be defined by $2^n$ wherein n is a count of focus pull-in operations. The count n of focus pull-in operation may be initially zero and increase by one when a focus pull-in operation is performed.

According to some embodiments of the present invention, upper and lower limit values of disk surface vibration are detected and stored per a predetermined time while a signal is reproduced from an optical disk device and, if focus on the disk deviates from a focus allowable range initially set, a focus repull-in operation is performed with reference to the upper and lower limit surface vibration values stored previously. Therefore, it is possible to adaptively and quickly perform optimal focusing against disk surface vibration generated differently according to a location on the disk.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
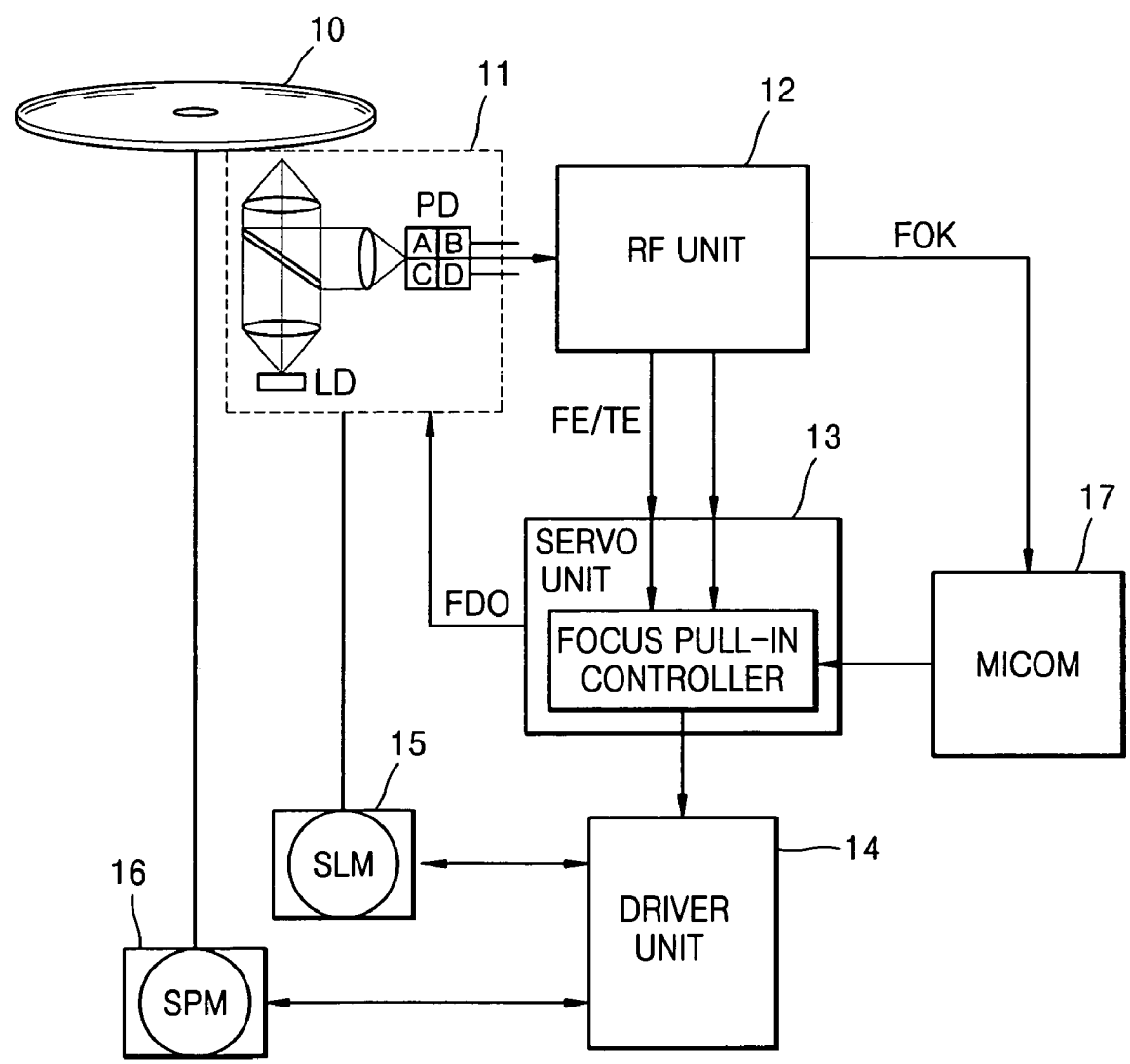
FIG. 1 is a block diagram of an optical disk device according to some embodiments of the present invention.

The present invention will now be described more fully with reference to the accompanying drawings, in which embodiments of the invention are shown. This invention may, however, be embodied in different forms and should not be construed as being limited to the embodiments set forth herein. Rather, these embodiments are provided so that this disclosure will be thorough and complete, and will fully convey the scope of the invention to those skilled in the art. In the drawings, the size or thickness of layers and regions are exaggerated for clarity. Like numbers refer to like elements. As used herein the term "and/or" includes any and all combinations of one or more of the associated listed items and may be abbreviated as "/".

It will be understood that, although the terms first and second may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, region, layer, or section discussed below could be termed a second element, region, layer, or section, and similarly without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, if a particular logic polarity is used herein to describe embodiments of the present invention, the opposite polarity may also be utilized for the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of an optical disk device according to some embodiments of the present invention. Referring to FIG. 1, the optical disk device includes an optical pickup unit 11 for reading a signal written on a disk 10 from the disk 10; an RF unit 12 for converting the signal read by the optical pickup unit 11 into a binary signal, providing a focus error signal FE and a tracking error signal TE, and outputting a focus OK signal FOK; a servo unit 13 for focusing and tracking an objective lens of the optical pickup unit 11 on the basis of the focus error signal FE and tracking error signal TE provided by the RF unit 12; a driver unit 14 for driving a thread motor 15 and a spindle motor 16 for rotating the disk 10; and a microprocessor (MICOM) 17 for detecting an amount of surface vibration of the disk 10 and compensating accordingly.

The optical pickup unit 11 includes a laser diode LD for emitting light when power is supplied, a diffractor (not shown) for diffracting light supplied by the laser diode LD, a beam splitter (not shown) for sub-dividing light, a focus coil (not shown) for driving an objective lens (not shown) using an output signal of the driver unit 14, a concave lens (not shown) for focusing light, and a photodiode PD for converting received light into an electric signal. When the disk 10 rotates, the laser diode LD emits light, the light passes through the diffractor to be sub-divided by the beam splitter, and falls on the disk through the objective lens. The light that falls on the disk is reflected and the reflected light passes through the objective lens and the beam splitter and is focused by the concave lens on the photodiode PD. The photodiode PD senses the light focused by the concave lens and converts the light into an electric signal.

The RF unit 12 filters a high frequency signal from the optical pickup unit 11 to thereby convert the signal into a binary signal, and transmits the binary signal to a digital signal processor (DSP; not shown). The DSP converts the binary signal received from the RF unit 12 into a digital signal. The servo unit 13 controls the driver unit 14 on the basis of the tracking error signal TE and the focus error signal FE provided by the RF unit 12 and the rotation speed of the disk 10. The servo unit 13 includes a focus pull-in controller 400 (FIG. 4) that monitors surface vibration of the disk 10 and changes the location of the objective lens with an actuator of the optical pickup unit 11. The focus pull-in controller 400 will be described in more detail later.

Figure 2:
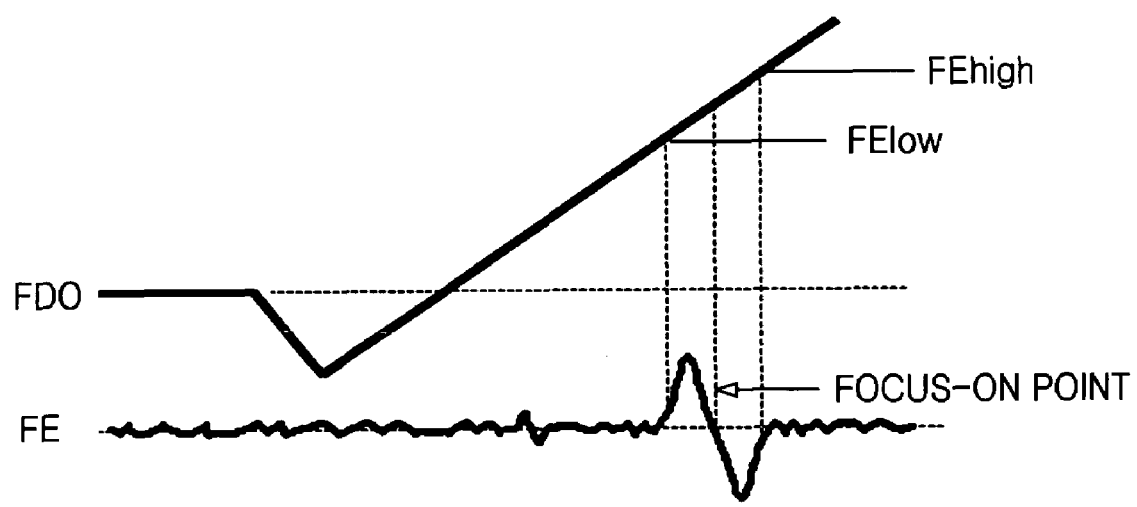
FIG. 2 is an illustration of an exemplary focus error signal FE at an initial focus-on point.
Figure 3:
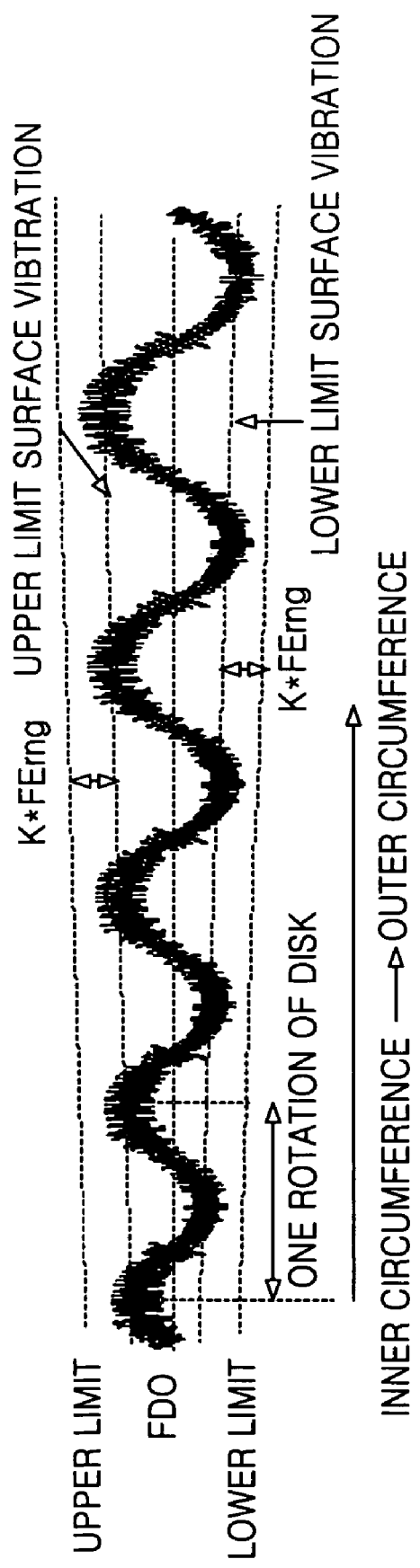
FIG. 3 is an illustration of an exemplary focus error signal FE generated along an outer circumference of the disk when a signal is reproduced from the disk.

The optical disk device of FIG. 1 first lowers the actuator and then raises it while monitoring the focus error in order to perform initial focusing of the optical pickup unit 11. As shown in FIG. 2, as the actuator is slowly raised, the focus error signal FE appears as a single sine wave at the moment when focus is achieved on the disk, that is, at the focus-on point. The focus error signal FE has a lower limit value FElow at the start point of the sine wave and an upper limit value FEhigh at an end point of the sine wave. The disk 10 may have greater surface vibration at the outer circumference than at the middle or at the inner circumference thereof. As seen in FIG. 3, a focus output signal has a lower frequency and has a greater amplitude at the outer edge of the disk 10 than at the middle.

Figure 4:
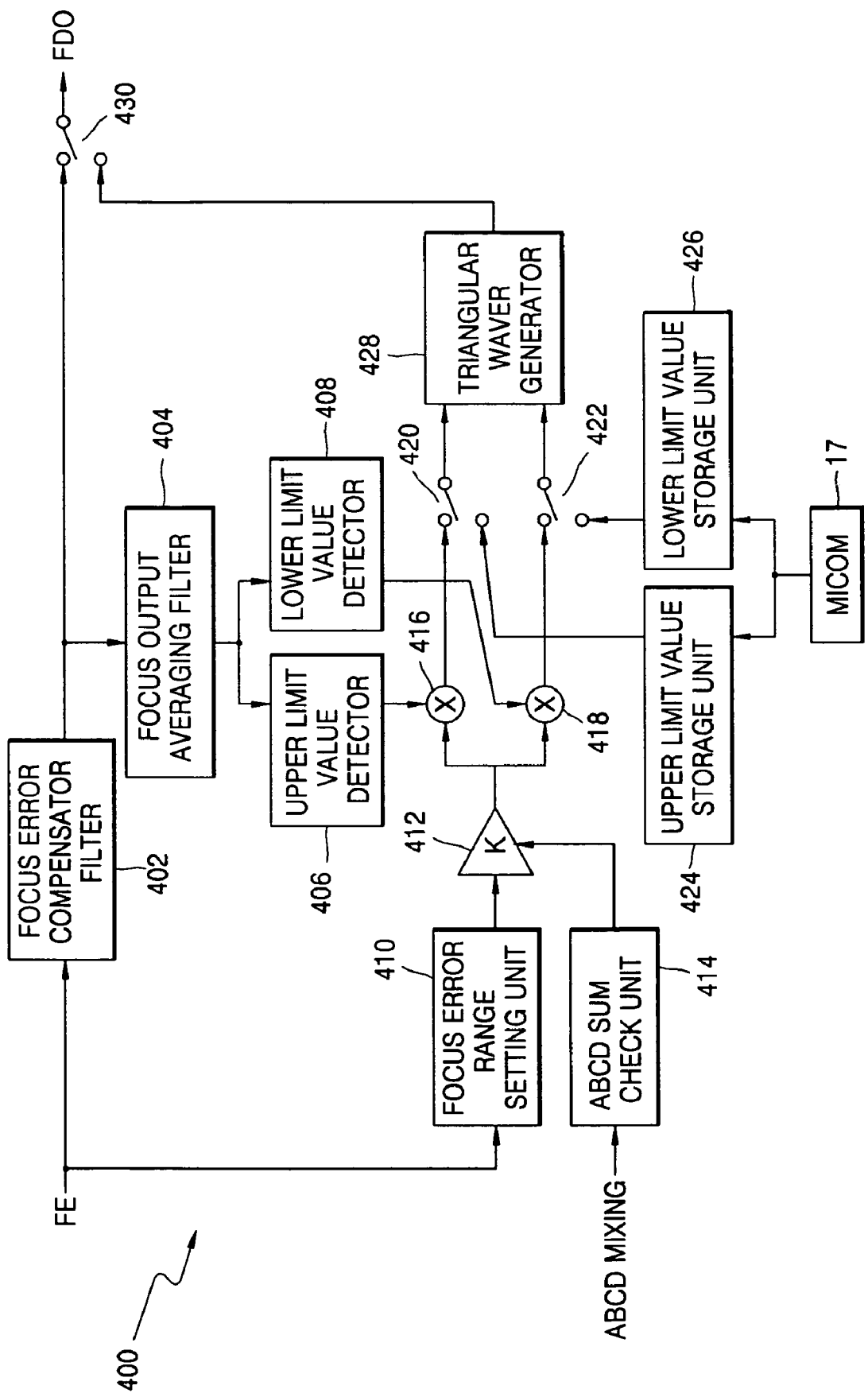
FIG. 4 is a block diagram of a focus pull-in controller according to some embodiments of the present invention.

FIG. 4 is a block diagram of a focus pull-in controller 400 according to some embodiments of the present invention. Referring to FIG. 4, the focus pull-in controller 400 includes a focus error compensator filter 402, which receives a focus error signal FE, compensates for the amplitude and phase of the focus error signal FE, and outputs a focus output signal FDO. A focus output averaging filter 404 averages the focus output signal FDO. An upper limit value detector 406 detects and stores an upper limit value of an output signal of the focus output averaging filter 404. A lower limit value detector 408 detects and stores a lower limit value of an output signal of the focus output averaging filter 404.

A focus error range setting unit 410 receives the focus error signal FE and sets a focus error search range of between an upper limit surface vibration value and a lower limit surface vibration value. The focus error search range is provided to an amplifier 412. The amplifier 412 multiplies the focus error search range by a predetermined error margin coefficient K, in response to an output signal of an ABCD sum check unit 414 which aggregates signals from A, B, C and D surfaces of a quadrantal photodiode. The error margin coefficient K in some embodiments is defined as $2^n$, where n is initially set to zero and increases by one whenever a focus pull-in operation is performed. That is, when a current focus pull-in operation fails, the amplifier 412 widens the focus error search range by a predetermined amount and then another focus pull-in operation is performed.

The output signal of the amplifier 412 and the output signal of the upper limit value detector 406 are provided to a first mixer 416. The output of the amplifier 412 and the output signal of the lower limit value detector 408 are provided to a second mixer 418. Output signals of the first and second mixers 416 and 418 are selectively provided to a triangular wave generator 428 through first and second switches 420 and 422, and the output of the triangular wage generator is selectively provided as a focus output signal FDO by the switch 430.

In accordance with the focusing operation of FIG. 2, the MICOM 17 lowers the actuator then raises it while monitoring the focus error in order to perform an initial focusing of the optical pickup unit 11 of FIG. 1. The MICOM 17 stores an upper limit value FEhigh of the focus error signal FE in an upper limit value storage unit 424 and a lower limit value FElow of the focus error signal FE in a lower limit value storage unit 426 at the moment when focus is achieved on the disk 10, that is, at the focus-on point.

The first and second switches 420 and 422 selectively transfer output signals of the first and second mixers 416 and 418 or output signals of the upper limit value storage unit 424 and the lower limit value storage unit 426 to the triangular wave generator 428. When focus on the disk 10 deviates from an allowable focus range, the triangular wave generator 428 swings the focus output signal FDO in a triangular wave, in response to output signals of the first and second mixers 416 and 418, to try to find the focus point. Also, the triangular wave generator 428 generates a triangular wave in response to output signals of the upper limit value storage unit 424 and the lower limit value storage unit 426, in order to detect an initial focus-on point.

A third switch 430 selects, as a focus output signal FDO, the output signal of the focus error compensator filter 402, if the focus error signal FE is within a normal allowable range, or the output signal of the triangular wave generator 428 driven by output signals of the first and second mixers 416 and 418, if the focus error signal FE deviates from the normal allowable range and, in some embodiments, during detection of the initial focus-on point when the triangle wave generator 428 is driven by the upper limit value storage unit 424 and the lower limit value storage unit 426. The focus output signal FDO controls the actuator of the optical pickup unit 11 of FIG. 1.

Figure 5:
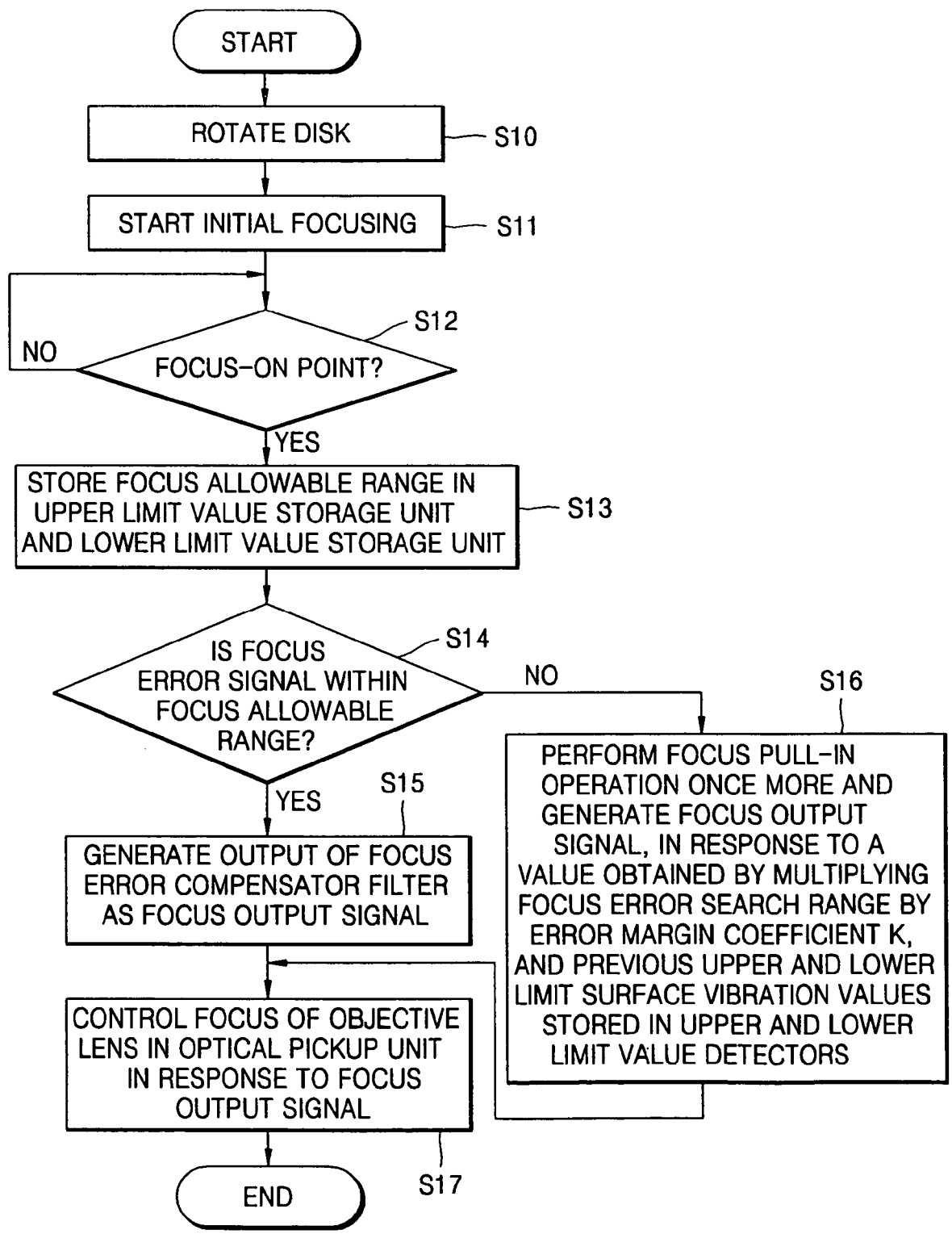
FIG. 5 is a flowchart illustrating operation of the focus pull-in controller of FIG. 4 according to some embodiments of the present invention.

Hereinafter, the operations of the focus pull-in controller 400 will be described with reference to FIG. 5. Referring to FIG. 5, when the disk 10 is loaded in the optical disk device, the MICOM 17 rotates the disk 10 using the spindle motor 16 of FIG. 1 (block S10). The MICOM 17 lowers the actuator of the optical pickup unit 11 of FIG. 1 and starts initial focusing while slowly raising the actuator toward the disk 10 (block S11). When focus of the objective lens is achieved (block S12), the MICOM 17 stores the upper limit value FEhigh and the lower limit value FElow of the focus error signal FE, as a focus allowable range, in the upper limit value storage unit 424 and the lower limit value storage unit 426, respectively (block S13).

After the initial focus, if the focus error signal FE is within the focus allowable range (block S14), the output signal of the focus error compensator filter 402 is output as a focus output signal FDO (block S15). The focus of the objective lens in the optical pickup unit 11 of FIG. 1 is controlled according to the focus output signal FDO (block S17). Thus, if the focus error signal FE is within the focus allowable range, the switch 430 is set to provide the output of the focus error compensator filter 402 as the output signal FDO and the optical pickup unit 11 is controlled based on the output of the focus error compensator filter.

If the focus error signal FE deviates from the focus allowable range (block S14), a focus pull-in operation is performed with reference to a value obtained by multiplying a focus error search range by an error margin coefficient K, and the respective upper and lower limit surface vibration values stored previously in the upper and lower limit value detectors 406 and 408, thereby generating a focus output signal FDO (block S16). The focus of the objective lens in the optical pickup unit 11 of FIG. 1 is controlled according to the focus output signal FDO (block S17).

Figure 6:
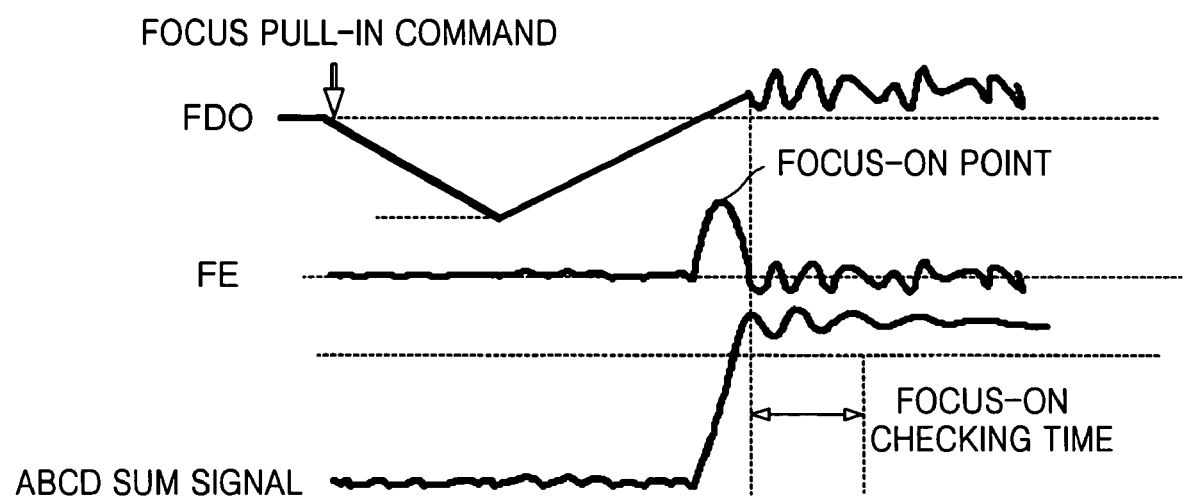
FIG. 6 is an illustration of exemplary waveforms of the focus pull-in controller of FIG. 4.

FIG. 6 is a chart of waveforms of the focus pull-in controller 400 of FIG. 4. Referring to FIG. 6, the actuator of the optical pickup unit 11 is first lowered and then raised toward the disk 10 according to a focus pull-in command. If an ABCD sum signal of the photodiode is maintained during a focus-on checking time when a focus error signal FE appears as a single sine wave at a focus-on point, the a focus output signal FDO is generated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A focus pull-in controller of an optical disk device, comprising:
   a focus error compensator filter configured to receive a focus error signal, compensate the focus error signal for amplitude and phase of the focus error signal, and output the compensated result as a first focus output signal;
   an upper limit value detector configured to detect and store an upper limit surface vibration value of the first focus output signal;
   a lower limit value detector configured to detect and store a lower limit surface vibration value of the first focus output signal;
   a focus error range setting unit configured to set a focus error search range based on the upper limit surface vibration value and the lower limit surface vibration value of the first focus error signal;
   an amplifier configured to multiply an output signal of the focus error range setting unit by a predetermined error margin coefficient K;
   a first mixer configured to sum an output signal of the upper limit value detector with an output signal of the amplifier;
   a second mixer configured to sum an output signal of the lower limit value detector with the output signal of the amplifier; and
   a triangular wave generator configured to generate a second focus control output signal in response to output signals of the first and second mixers.

2. The focus pull-in controller of claim 1, further comprising:
   an ABCD sum check unit configured to mix signals emitted from a quadrantal photodiode in the optical disk device.

3. The focus pull-in controller of claim 2, wherein the amplifier multiplies an output signal of the focus error range setting unit by a predetermined error margin coefficient K, in response to an output signal of the ABCD sum check unit.

4. The focus pull-in controller of claim 1, wherein the predetermined error margin coefficient K is defined by $2^n$ wherein n is a count of focus pull-in operations.

5. The focus pull-in controller of claim 4, wherein the count n of focus pull-in operations is initially zero and increases by one when a focus pull-in operation is performed.

6. A focus pull-in controller of an optical disk device, comprising:
   an upper limit value storage unit configured to store an upper limit value of a focus error signal within a focus error allowable range detected at an initial focus-on point of the disk;
   a lower limit value storage unit configured to store a lower limit value of the focus error signal within the focus error allowable range detected at the initial focus-on point of the disk;
   a focus error compensator filter configured to receive the focus error signal, compensate for amplitude and phase of the focus error signal, and output the compensated result as a first focus output signal;
   an upper limit value detector configured to detect and store an upper limit surface vibration value of the first focus output signal;
   a lower limit value detector configured to detect and store a lower limit surface vibration value of the first focus output signal;
   a focus error range setting unit configured to set a focus error search range based on the upper limit surface vibration value and the lower limit surface vibration value of the first focus error signal;
   an ABCD sum check unit configured to mix signals from a quadrantal photodiode;
   an amplifier configured to multiply an output signal of the focus error range setting unit by a predetermined error margin coefficient in response to an output signal of the ABCD sum check unit;
   a first mixer configured to mix an output signal of the upper limit value detector with an output signal of the amplifier;
   a second mixer configured to mix an output signal of the lower limit value detector with an output signal of the amplifier;
   a first switch configured to provide as an output a selected one of an output signal of the first mixer or an output signal of the upper limit value storage unit;
   a second switch configured to provide as an output a selected one of an output signal of the second mixer or an output signal of the lower limit value storage unit;

a triangular wave generator configured to generate a second focus output signal as a triangular wave in response to the output signals of the first and second switches; and a third switch configured to selectively output the first focus output signal or the second focus output signal.

7. The focus pull-in controller of claim 6, wherein the error margin coefficient is defined by $2^n$ wherein n is a count of focus pull-in operations.

8. The focus pull-in controller of claim 7, wherein the count n of focus pull-in operation is initially zero and increases by one when a focus pull-in operation is performed.

9. The focus pull-in controller of claim 6, wherein each of the first and second switches are configured to transfer the respective one of the output signals of the first and second mixers to the triangular wave generator if the focus error signal deviates from the focus error allowable range.

10. The focus pull-in controller of claim 6, wherein the third switch outputs the second focus output signal if the focus error signal deviates from the focus error allowable range.

11. A focus control method for an optical disk device, comprising:

rotating a disk when the disk is loaded in the optical disk device;

performing initial focusing while moving an actuator of an optical pickup unit in the optical disk device toward the disk;

storing a focus error allowable range corresponding to a range between an upper limit value and a lower limit value of a focus error signal when focus is achieved on the disk;

setting a focus error search range using a focus error signal;

outputting, as a focus output signal, an output signal of a focus error compensator filter that receives the focus error signal if the focus error signal is within the focus error allowable range;

averaging the output signal of the focus error compensator filter and obtaining and storing an upper limit surface vibration value and a lower limit surface vibration value;

performing a focus pull-in operation with reference to a value obtained by multiplying the focus error search range by an error margin coefficient K, the upper limit surface vibration value, and the lower limit surface vibration value to provide the focus output signal if the focus error signal deviates from the focus error allowable range; and controlling focusing of the optical pickup unit according to the focus output signal.

12. The focus control method of claim 11, wherein the focus error compensator filter compensates for amplitude and phase of the focus error signal.

13. The focus control method of claim 11, wherein the error margin coefficient K is defined by $2^n$ wherein n is a count of focus pull-in operations.

14. The focus control method of claim 13, wherein the count n of focus pull-in operations is initially zero and increases by one when a focus pull-in operation is performed.

* * * * *